UNITED STATES PATENT OFFICE.

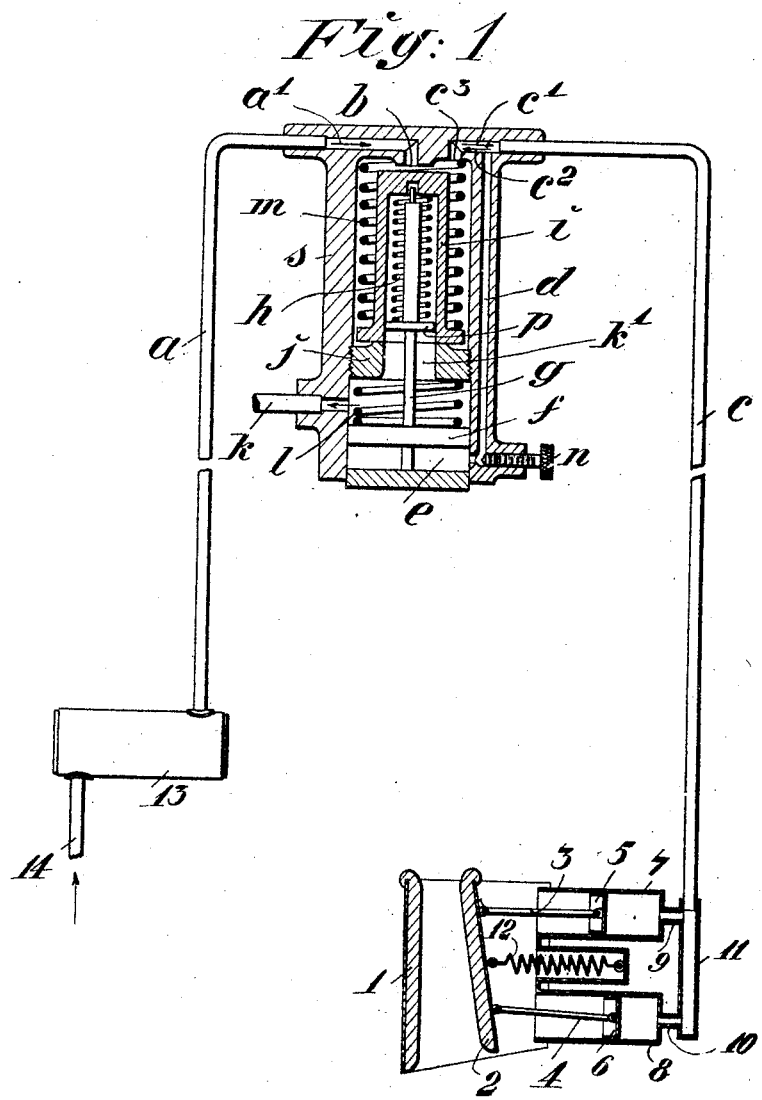

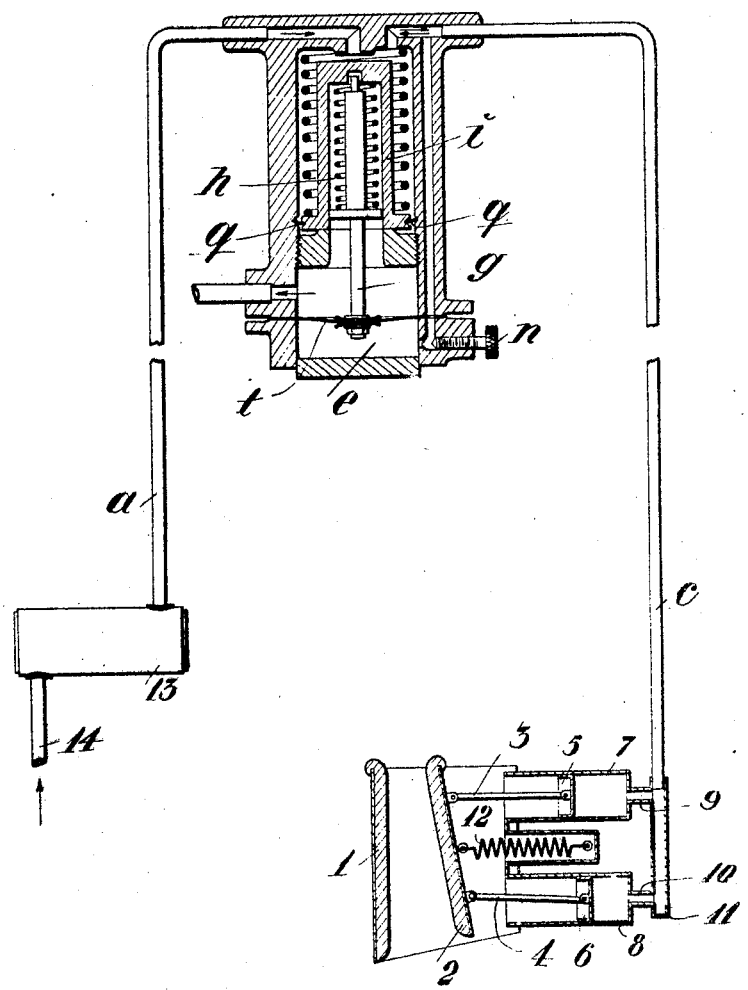

GUSTAF DALÉN, OF STOCKHOLM, SWEDEN.

DEVICE FOR ESTABLISHING A PULSING MOTION OF FLUID IN CONDUITS.

976,556.   Specification of Letters Patent.   Patented Nov. 22, 1910.

Application filed April 6, 1907. Serial No. 366,844.

*To all whom it may concern:*

Be it known that I, GUSTAF DALÉN, engineer, subject of Sweden, residing at Stockholm, Sweden, have invented new and useful Improvements in Devices for Establishing a Pulsing Motion of Fluids in Conduits, of which the following is a specification.

The present invention has for its object a device for automatically establishing a pulsating or intermittent motion of a fluid in a conduit, which is connected with a feeding conduit, in which the fluid has a constant direction of motion, established by means of a pump or the like. Such device may be used in connection with a milking apparatus in which the milking members are connected with pistons movable in cylinders to which the pulsating fluid in question is led.

The invention is illustrated in the accompanying drawings, in which—

Figure 1 shows a vertical section of the pulsator in combination with the milking machine. Fig. 2 shows a similar view of a modified form.

In Fig. 1 $a$ indicates a feeding conduit connected with a receiver 13, which receiver is connected through a pipe 14 with a suitable fluid compressor (not shown on the drawing) and thus filled with fluid under pressure. The fluid flows from the receiver to the pulsator in the direction indicated by the arrow $a'$. $c$ indicates another conduit in which a pulsating motion of the same fluid in opposite directions as indicated by the arrows $c'$, $c^2$ is required. In the casing $s$ of the apparatus the conduit $a$ opens at the shoulder $b$, whereas the conduit $c$ opens at $c^3$. In the casing is placed a block $i$ which is movable to and fro in the manner described below and is acted upon by a spring $m$ tending to press the block away from the shoulder $b$. The movements of the block are limited in the one direction by the shoulder $b$ and in the opposite direction by a hollow plug $j$, secured in the casing $s$. The conduit $c$ opens, as mentioned, into the casing of the apparatus at $c^3$ and from the same or from its prolongation in the casing extends a branch conduit $d$, which opens into the chamber $e$ beneath a piston $f$, which is movably positioned within the interior of the casing, and which is provided with a piston rod $g$ extending through the hollow plug $j$. Between the block $i$ and a shoulder $p$ on the rod $g$ is inserted a spring $h$, tending to press the rod $g$ and the piston $f$ downward. Between the plug $j$ and the piston $f$ is inserted another spring $l$ tending to press the piston $f$ downward. The casing is provided with an outlet conduit $k$ which communicates with the chamber $k'$ above the piston $f$.

The conduit $c$ is connected with the milking machine, the particular form of which does not constitute an object of the present invention, through a distributing chamber 11, which is connected through pipes 9 and 10 with cylinders 7 and 8. In these cylinders pistons 5 and 6 are movably mounted being connected by rods 3 and 4 with a movable pad 2. The milking device further comprises a stationary pad 1.

When fluid under pressure is admitted to the cylinders 7 and 8 the pistons 5 and 6 move forward successively, as the pipe 9 is of greater cross section than the pipe 10, and in consequence the upper end of the pad will advance, thereby first squeezing the teat, inserted in the space between the movable and the stationary pad, at the root, shutting off the communication with the udder, after which the lower part of the pad is moved forward thereby pressing out the milk contained in the teat. As soon as the pistons and the movable pad have completed their forward motion, the fluid in the pipe $c$ is put in communication with the open air, as will be fully explained below. As soon as the pressure behind the pistons falls to the atmospheric pressure, the spring 12 acts upon the movable pad 2 and brings the pad as well as the pistons back to their former position, forcing the fluid to return through the pipe $c$ and the pulsator.

As stated the fluid under pressure having acted upon the pistons 5 and 6 of the milking device is discharged through the pulsator to the open air. This is effected in the following way. In the position of the pulsator shown in the drawing the fluid flows, as indicated, from the receiver 13, through pipe $a$, through openings $b$ and $c^3$ and pipe $c$ to the milking device. But a portion of the fluid passes simultaneously through the branch conduit $d$ to the chamber $e$ beneath the piston $f$ and presses this latter upward against the action of the spring $l$. As the piston moves upward the spring $h$ is first compressed, being weaker than the spring $m$, until the spring $h$ is capable of overcoming the spring $m$, when the block $i$ is moved toward the shoulder $b$ and closes the open end of the pipe $a$ formed therein. Thereby the communication between pipes $a$ and $c$ is interrupted but on the other hand communication between pipes $c$ and $k$ is established by reason of the fact that the block $i$ has left the plug $j$, so that the fluid can flow in an opposite direction to the former direction of flow as indicated by the arrow $c^2$ through the conduit $c$, opening $c^3$ the space between $i$ and the wall of the apparatus to the chamber $k'$ and the outlet conduit $k$, which leads out into the atmosphere or to a suitable receptacle. As simultaneously with this flow the pressure in the conduit $c$ and thus also in the chamber $e$ falls, the spring $m$ first begins to press the block $i$ away from the shoulder, $b$ until its spring force amounts to that of the spring $h$, after which the latter spring forces the piston $f$ back to its original position. When the block $i$ reaches the end of its movement away from the shoulder, the communication between $c$ and $k$ is closed, and that between $a$ and $c$ is again opened, and the above described operation is repeated. The pressure beneath the piston $f$ can be regulated by means of a screw $n$, screwed in the conduit $d$. The pulsating apparatus is thus constructed in such a manner that at the moment when the pistons of the milking device have completed their forward movement and the teat having been squeezed between the movable and the stationary pads the position of the block $i$ is reversed so that the fluid behind the pistons of the milking device is led off through the pulsator to the atmosphere.

To secure the most advantageous results with the device the chances of simultaneously opening the passages $b$ and $k$ must be reduced to a minimum, and to secure this the block $i$ must be moved from one position to the other as quickly as possible. For this purpose several devices may be used. The most simple one seems to be to make the block $i$ magnetic, and the shoulders at $b$ and $j$ of iron, or vice versa to make said shoulders magnetic with different poles toward one another. Hereby the block is retained in its end positions until the above mentioned forces for moving the same in the one or other direction have been so great as to overcome the magnetism, in which moment the block is suddenly pulled from one position to the other. Another method of retaining the block is shown in Fig. 2, where curved blade springs $q$ are shown inserted between the block $i$ and the wall of the casing. On account of the curved form of the springs they tend to retain the block in one or the other of its extreme positions, but as soon as their spring force is once overcome, the block will be suddenly carried over to its other extreme position by the forces acting upon the block. If desired, both these means, magnetic block and curved blade springs, may be used simultaneously.

In the modified form illustrated in Fig. 2 a diaphragm $t$ is used instead of the piston $f$ shown in Fig. 1. The under pressure fluid entering the chamber $e$ is thereby pressing on the under side of the diaphragm, which is connected with the rod $g$, so that the latter is moved upward thereby pressing the block against the shoulder as described before.

Having described the invention what is claimed as new is:—

1. In pulsators for milking machines operated by pressure, the combination with a casing, of a block movable therein between two seats, two conduits opening into the casing chamber above the block, one of said conduits opening through one of said seats, a piston connected with the block and movable in a part of the casing beneath the block, a branch from one of the conduits, opening into the casing chamber beneath the piston, a transverse partition wall between the block and the piston, provided with the second seat for the block, and an outlet conduit opening in the casing chamber between the partition wall and the piston.

2. In pulsators for milking machines operated by pressure, the combination with a casing, of a block movable therein between two seats, means for holding the block alternately toward said seats, two conduits opening into the casing chamber above the block, one of said conduits opening through one of said seats, a piston connected with the block and movable in a part of the casing beneath the block, a branch from one of the conduits, opening in the casing chamber beneath the piston, a transverse partition wall between the casing chamber in which the block is movable and the casing chamber in which the piston is movable, provided with the second seat for the block, and an outlet conduit opening in the casing chamber between the partition wall and the piston.

3. In pulsators for milking machines operated by pressure, the combination with a casing divided in two compartments in communication with one another through the partition between the compartments, of a block movable in one of the compartments between two seats therein, two conduits opening into the casing chamber above the block, one of said conduits opening through one of said seats, a piston connected with the block movable in the other compartment of the casing, a branch from the other conduit opening beneath the piston, and an outlet conduit opening in the piston compartment above the piston.

4. In pulsators for milking machines operated by pressure, the combination with a casing divided in two compartments in communication with one another through the partition between the compartments, of a block movable in one of the compartments between two seats therein, two conduits
5 opening into the casing chamber above the block, one of said conduits opening through one of said seats, a piston connected by a spring with the block and movable in the other compartment of the casing, a branch
10 from the other conduit opening beneath the piston, and an outlet conduit opening in the piston compartment above the piston.

In testimony whereof I have signed my name to this specification in the presence of two subscribing witnesses.

GUSTAF DALÉN.

Witnesses:
WALDEMAR BOMAN,
T. EKEBOHM.